Patented June 6, 1939

2,160,948

UNITED STATES PATENT OFFICE 2,160,948

VINYLIDENE CHLORIDE POLYMERIC COMPOSITIONS

Ralph M. Wiley, Francis N. Alquist, and Harold R. Slagh, Midland, Mich., assignors to The Dow Chemical Company, Midland, Mich., a corporation of Michigan No Drawing. Application October 23, 1937, Serial No. 170,642

10 Claims. (Cl. 260—36)

This invention relates to compositions of matter comprising polymeric vinylidene chloride products and modifying agents therefor, especially such modifying agents as contain epoxy groups.

When vinylidene halides, more particularly vinylidene chloride, are polymerized, the product obtained may vary in properties from a gel-like material through bone-like solids to hard powdery polymers. When the polymerization is carried to substantial completion, the latter type of product is ordinarily produced. This material may be molded at temperatures above its softening point but the molded product is ordinarily characterized by a hardness and lack of plasticity which does not adapt it to many of the applications for which other synthetic resinous materials are commonly employed. The plastic properties of a polymeric vinylidene chloride product may be considerably modified by polymerizing the vinylidene chloride together with another polymerizable material such as vinyl chloride, vinyl acetate, styrene, alkyl acrylates and alkyl esters of substituted acrylic acid compounds, divinyl ether, etc. Such co-polymers generally have somewhat lower softening points than that of polymeric vinylidene chloride alone. They are not, however, sufficiently resilient to be very rubbery in nature, and are subject to thermal decomposition at temperatures only slightly above their softening point.

It is an object of the present invention to provide a polymeric vinylidene chloride product which is resistant to thermal decomposition at temperatures sufficiently above the softening point thereof so that the polymer may be readily worked while in a plastic state. It is a further object of the invention to provide a resilient or rubbery composition of matter comprising a polymeric vinylidene chloride product.

We have now found that the foregoing objects may readily be attained by incorporating in the polymer or co-polymer, either before or after polymerization, an alkyloxy- or aryloxy-substituted aliphatic epoxy compound. Examples of such compounds which have been tested and found suitable for the above purposes include normal-butyl-oxy propylene oxide, phenoxy-propylene oxide, parachloro-phenoxy-propylene oxide, para-tertiary-butyl-phenoxy-propylene oxide, hexahydro-phenoxy-propylene oxide, ortho-cresoxy-propylene oxide, phenyl phenoxy-propylene oxide, phenoxy-butylene oxide, etc., all of which may be prepared from epichlorohydrin or methyl epichlorohydrin or from similar derivaties of propylene oxide (1,2-epoxy propane) and its homologs.

The amount of aliphatic epoxy derivative to be employed may vary widely with the type of co-polymer to which it is added and the properties desired in the plasticized product. In general, from 1 to 40 per cent of the plasticizer and stabilizing agent may be employed, based on the weight of the polymeric vinylidene chloride in which it is incorporated. When it is desired simply to stabilize the polymer against thermal decomposition at temperatures slightly above the softening point thereof, the amount of aliphatic epoxy derivative will ordinarily vary from about 1 to 10 per cent. When, however, it is desired to produce a polymeric product of a highly plastic nature, the amount of addition agent employed may vary from about 5 to 40 per cent.

The following example illustrates the practice of our invention: To a mixture of 70 parts vinylidene chloride and 30 parts vinyl acetate, by volume, was added 1.5 per cent by weight of a mixture of equal parts of benzoyl peroxide, chloroacetyl chloride, and nickel carbonyl as catalysts, and 3 per cent by volume of phenoxy-propylene oxide. The mixture was subjected to polymerization at 30° C. for about 4 days. The co-polymer had a softening point of about 170° C. and was stable at temperatures up to about 200° C. To 10 grams of the co-polymer was added 4 grams of phenoxy-propylene oxide by grinding the materials together in a mortar until a uniform composition was obtained. The resulting mixture had a softening point slightly below 160° C. and at the latter temperature readily fused to give a nearly transparent mass, which, when cooled to room temperature formed a very tough rubbery material.

When the new plasticizers and heat-stabilizing agents are added to the polymeric material rather than to the monomer prior to polymerization, any of several methods may be employed to effect the mixing or compounding of the composition. For example, the polymer or co-polymer of vinylidene chloride, and the particular alkyloxy- or aryloxy-derivative of an aliphatic epoxy compound to be employed may be mixed or ground together in a ball mill or other suitable mixer commonly employed in the plastics art, or they may be added to the polymer on hot rolls in a method similar to that employed in compounding rubber compositions. Another satisfactory method of incorporating the plasticizers in the polymeric composition is to dissolve the plasticizer in a relatively volatile solvent such as acetone or alcohol and masticate the polymer with the solution, thereafter evaporating the volatile solvent.

The materials which we prefer to employ are those alkyloxy- or araloxy-substituted epoxy aliphatic compounds which are liquids at or near room temperature. If, however, the epoxy compounds are intimately dispersed throughout the polymer and are compatible therewith, it is not essential that they be liquid products.

The use of phenoxy-propylene oxide as a plasticizer and heat-stabilizing agent has been disclosed by one of us, but not claimed, in a copending application Serial Number 146,418, filed June 4, 1937.

Other modes of applying the principle of our invention may be employed instead of those explained, change being made as regards the materials employed, provided the step or steps or the products recited in the following claims be thereby carried out or obtained.

We therefore particularly point out and distinctly claim as our invention:

1. A composition of matter comprising a polymeric vinylidene chloride product plasticized with a compound selected from the group consisting of alkyloxy- and aryloxy-substitution products of propylene oxide and its homologs, to increase the resistance of the polymer to thermal decomposition and to increase the resilience and workability of the said polymer.

2. A composition of matter comprising a polymeric vinylidene chloride product, plasticized with between about 1 and about 40 per cent of a compound selected from the group consisting of alkyloxy- and aryloxy-substitution products of propylene oxide and its homologs, to increase the resistance of the polymer product to thermal decomposition and to increase the resilience and workability of the said polymer.

3. A composition of matter comprising a polymeric vinylidene chloride product plasticized with an alkyloxy-substituted propylene oxide, to increase the resistance of the polymer to thermal decomposition and to increase the resilience and workability of the said polymer.

4. A composition of matter comprising a polymeric vinylidene chloride product plasticized with an aryloxy-substituted propylene oxide, to increase the resistance of the polymer to thermal decomposition and to increase the resilience and workability of the said polymer.

5. The process which comprises polymerizing vinylidene chloride in the presence of from 1 to 10 per cent, based on the weight of polymerizable material present, of a compound selected from the group consisting of alkyloxy- and aryloxy-substitution products of propylene oxide and its homologs, to provide a polymer with increased resistance to thermal decomposition.

6. The process which comprises polymerizing vinylidene chloride in the presence of from 1 to 40 per cent, based on the weight of polymerizable material present, of a compound selected from the group consisting of alkyloxy- and aryloxy-substitution products of propylene oxide and its homologs, to provide a polymer with increased workability, resilience, and resistance to thermal decomposition.

7. The process which comprises polymerizing vinylidene chloride in the presence of from 1 to 10 per cent, based on the weight of polymerizable material present, of a compound selected from the group consisting of the alkyloxy- and aryloxy-substitution products of propylene oxide and its homologs, and thereafter mixing the so-formed polymeric composition with between about 5 and about 40 per cent by weight of a compound selected from the group consisting of the alkyloxy- and aryloxy-substitution products of propylene oxide and its homologs, to provide a polymer with increased workability, resilience, and resistance to thermal decomposition.

8. The process which comprises polymerizing vinylidene chloride in the presence of phenoxy-propylene oxide.

9. The process which comprises polymerizing vinylidene chloride in the presenec of between about 1 and about 10 percent by weight of phenoxypropylene oxide and thereafter mixing the so-formed polymeric composition with between about 5 and about 40 per cent by weight of phenoxypropylene oxide.

10. A composition of matter comprising a polymeric vinylidene chloride product plasticized with phenoxy propylene oxide to increase the resistance of the polymer to thermal decomposition and to increase the resilience and workability of said polymer.

RALPH M. WILEY.
FRANCIS N. ALQUIST.
HAROLD R. SLAGH.